Feb. 19, 1952 W. E. SULLIVAN 2,586,738
SIDE FRAME CONSTRUCTION FOR POWER LAWN MOWERS
Filed Jan. 13, 1950 2 SHEETS—SHEET 1

INVENTOR
WILLIAM E. SULLIVAN
BY Chapin & Neal
ATTORNEYS

Feb. 19, 1952 W. E. SULLIVAN 2,586,738
SIDE FRAME CONSTRUCTION FOR POWER LAWN MOWERS
Filed Jan. 13, 1950 2 SHEETS—SHEET 2

INVENTOR
WILLIAM E. SULLIVAN
BY Chapin & Neal
ATTORNEYS

Patented Feb. 19, 1952

2,586,738

UNITED STATES PATENT OFFICE 2,586,738

SIDE FRAME CONSTRUCTION FOR POWER LAWN MOWERS

William E. Sullivan, Springfield, Mass., assignor to Savage Arms Corporation, Utica, N. Y., a corporation of Delaware Application January 13, 1950, Serial No. 138,285

2 Claims. (Cl. 56—26)

This invention relates to improvements in side frame constructions for power driven, reel-type, lawn mowers.

An object of the invention is to provide a simplified and rugged side frame for housing the driving sprocket of a power mower.

Another object is to provide a unitary casting construction for easy assembly of the mower parts and for servicing the same.

A further object of the invention is to provide a frame construction, more economical to manufacture than prior art structures, yet containing in two unitary side plate structures various protective shields and guards as well as the necessary supporting structure for a motor reel and other mower parts.

A still further object is to provide a protective well for a motor driven sprocket chain and to make provision in such construction for the convenient disposition of the handle and supporting structure.

These and other objects and advantages will be apparent from the following description and from the accompanying drawings.

Figure 1:
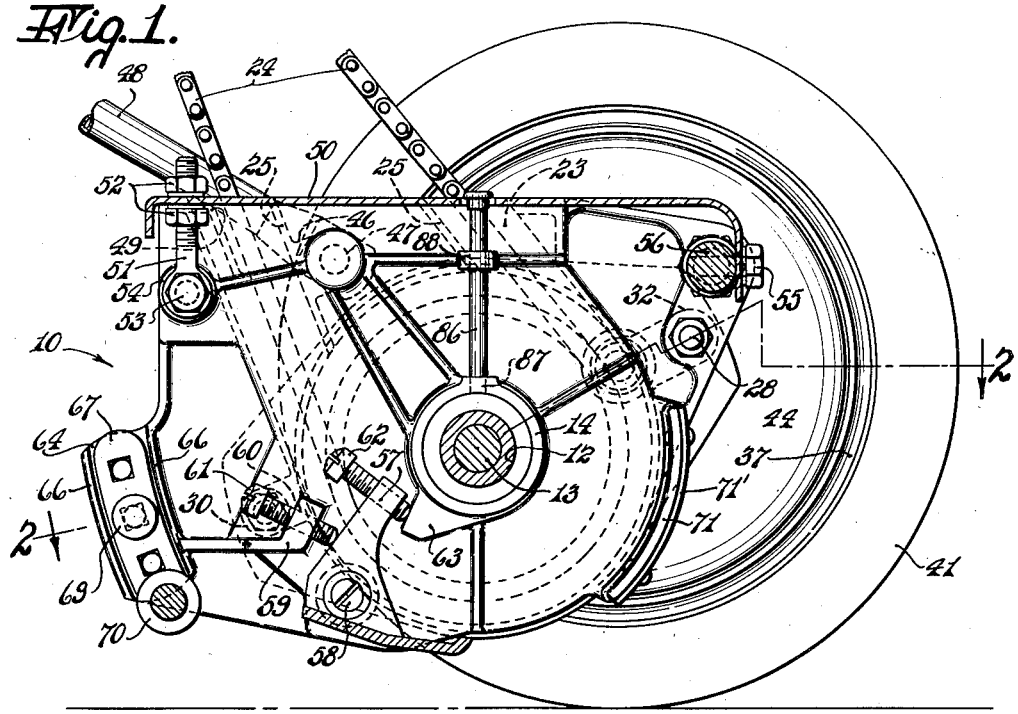
Fig. 1 is a vertical sectional view of a reel-type lawn mower taken through the reel shaft just beyond one end of the reel and showing a side frame incorporating my invention.

Referring to the drawings, the new frame supports comprise a side frame 10 (Figs. 1–3) having a reel drive sprocket housing on one side of the mower and its opposite side frame 11 (Figs. 4–5) for the other side of the mower.

Both frames are unitary castings and are generally similar in form, one being the reverse of the other, with the exception that casting frame 11 has no provision for a sprocket housing. Plate 11 is, however, provided with an integral wheel guard structure for protection of the driving gears of its adjacent mower wheel as will be described.

Frame 10 is formed with a substantially flat casting plate having a centrally disposed opening 12 through which one end of a reel shaft 13 (Fig. 2) projects. Around opening 12 on the inboard side of the plate, i. e. the side facing the reel, is a bearing housing 14 into which fits a roller bearing assembly 15 (Fig. 2) held in place by an adjustable sleeve 18 fixed to the reel shaft as by a set screw 19. A sealing washer 16 and sealing ring 17 complete the bearing assembly.

On the outboard side of opening 12, i. e. on the other side of the plate and facing the wheel, is an open sided sprocket housing chamber 20 formed by a circular flanged wall 21 projecting from the plate. Within chamber 20 and keyed to reel shaft 13, is located a reel shaft driving sprocket 22. By this arrangement the sprocket 22 is positioned outwardly of the side frame proper and the reel shaft bearing 15. The bearing 15 is as close to the reel as possible with no long length of reel shaft unsupported between the reel and its bearing.

Figure 2:
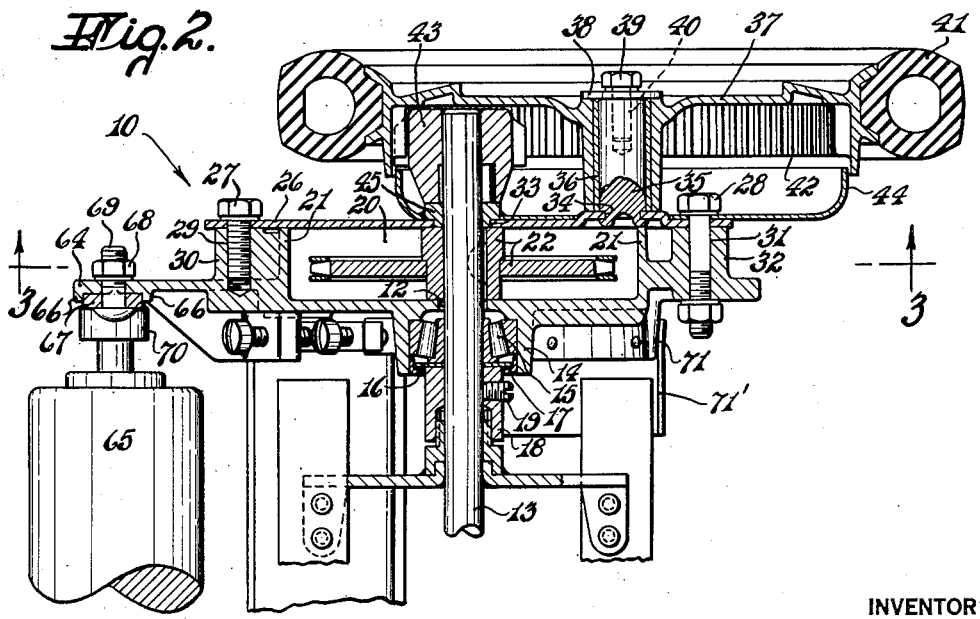
Fig. 2 is a horizontal sectional view on line 2—2 of Fig. 1 with fragments of the roller and reel also shown.

In the upper portion of the circular wall 21 of the housing is an opening providing for a passage communicating with a chain well for entrance to and exit from the housing of an endless driving chain 24 from the top of the frame. The chain well is formed with one side wall provided by the upper portion of the casting plate (Fig. 1). The outer side wall is formed by a panel as at 23 (Fig. 3) spaced from the upper portion of the plate. Panel 23 is integrally joined by front and rear walls 21' provided by the upward end extensions of the circular flange 21 of the sprocket housing. Integral webbed portions 25 (Fig. 3) between side panel 23 and the casting plate provide vanes for spaced runways at the front and rear for guiding the chain 24.

A wheel plate 26 provides a closure for the open side of the sprocket housing 20 (Fig. 2) fitting over the peripheral edge of circular portion of wall 21. Wheel plate 26 is held in place by a screw 27 and a bolt 28, screw 27 engaging the threads of threaded bolt hole 29 in an integral boss 30 on the casting plate and bolt 28 fitting through hole 31 in another integral boss 32 diametrically opposite boss 30 (see Fig. 3).

Wheel plate 26 has a central reel shaft opening 33 and a flanged wheel axle opening 34 and in the latter a stationary stub axle 35 is secured. A bushing 36 fits over the stub axle and a lawn mower wheel 37 revolves on the bushing held in place by a washer 38 and a screw 39 in threaded hole 40 in the free end of the stub axle.

Wheel 37 has a rim portion mounting a rubber tire 41 and containing an internal gear ring 42 which is driven by an external spur gear pinion 43 having a conventional lawn mower pinion ratchet connection to shaft 13.

A cup-shaped grass clipping shield or guard 44 having openings for stub axle 35, bolt 28 and reel shaft 13 is mounted between the plate 26 and the rim portion of wheel 37. The guard 44 has a bushing 45 welded in its reel shaft opening which extends through the reel shaft opening in plate 26 and abuts the hub of the reel shaft driving sprocket 22. Guard 44 is held in position by bolt 28 on the integral stud 32 of the casting plate of frame 10.

The wheel 37 thus supports the frame in the mower assembly through wheel plate 26 which serves also to cover the sprocket housing as well.

Figure 5:
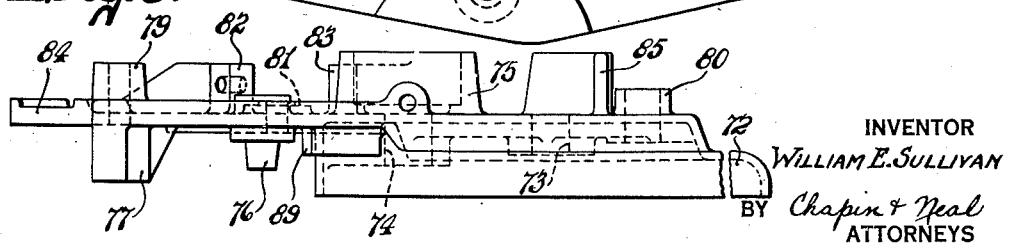
Fig. 5 is a top plan view of Fig. 4.

It will be noted that a reinforcing stud 46 integral with the side walls of the chain well is provided in addition to the webbed connections as at 25. The stud 46 serves to strengthen and give added rigidity to the side panel 23. An integral handle pin 47 projects outwardly of panel 23 at the side thereof (in a manner similar to a handle pin 76 of side frame 11 as seen in Fig. 5) and provides an extension of stud 46 for the pivotal mounting of a mower handle arm 48.

Arm 48, as will be readily understood is one of the forked arms of a mower handle of any usual construction having its other arm adapted for mounting on a pin of the frame at the opposite side of the mower. The tension of the arms holds the ends thereof on the mounting pins.

The arm as indicated is pivotally mounted on the pin 47 and a rear stop lug 49 (Fig. 3) extending outwardly of the panel 23 is provided to limit the downward swing of the arm 48. Support for a motor deck 50 between the side frames and wheels of the mower is provided at the inboard side on frame 10 by the upper flat edge of the casting plate. The chain 24 thus is on the outside of the deck edge for connection with any suitable driving means from the motor.

Figure 3:
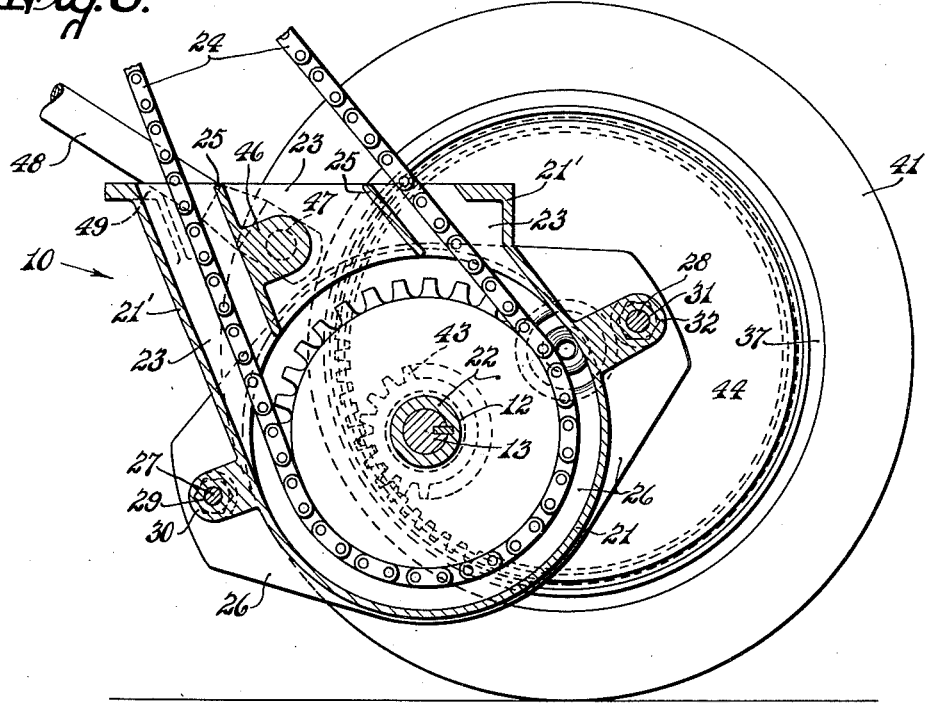
Fig. 3 is a vertical sectional view taken on line 3—3 of Fig. 2.

Plate 50 is tied rearwardly at its edge by a bolt 51 and adjusting nuts 52 which hold the deck between them. Bolt 51 is attached to the plate by a retaining screw 53 threaded into a stud 54 through the ring head of said bolt 51. Forwardly the deck is attached by a bolt 55 threaded into a tie rod 56 joining the side frames. Tie rod 56 is threaded into the casting plate of frame 10 at the front thereof as shown by Fig. 3. The adjusting nuts 52 on the threaded upper end of ring head bolt 51 enable the raising and lowering of the motor deck for adjusting the tension of the chain 24 on the sprocket all as will be readily understood.

On the lower portion of the casting plate (Figs. 1 and 2) a bed knife clamp 57 is pivotally mounted by a screw 58 to the frame 10 near its lower edge and at the inboard side thereof. Spaced from clamp 57 and on the face of the plate is a lug 59 containing a threaded hole 60 through which a set screw 61 extends. The end of set screw 61 bears against one edge of the bed knife clamp to provide means for adjusting and holding the bed knife in proper position. A second knife clamp adjusting set screw 62 extends through a threaded hole in the top of bed knife clamp 57. A lug 63 projecting downwardly from the bearing housing 14 provides a bearing surface for the end of set screw 62. The two set screws 61 and 62 provide the means for easy and positive adjustment of the bed knife.

At the rear edge of frame 10 is an integral roller bracket groove 64 which has a series of openings for raising or lowering a roller 65. Bracket groove 64 has raised flanges 66 on either side of the openings between which slides an elongated bracket 67 having openings matching those in bracket groove 64. Roller 65 is mounted on the lower end of the bracket 67. The adjustment of bracket 67 with respect to the groove 64, secured thereto by a nut 68 and bolt 69 (Fig. 2), determines the height of the roller. A collar 70 on the roller shaft abuts the bracket 67.

At the forward edge of plate 10 is a grass deflector flange 71 in the form of an integral projection on the inboard side of the plate. The flange holds a deflector 71' which directs tall grass downwardly toward the reel to deflect it away from that end of the reel shaft and prevent its winding around the shaft.

Figure 4:
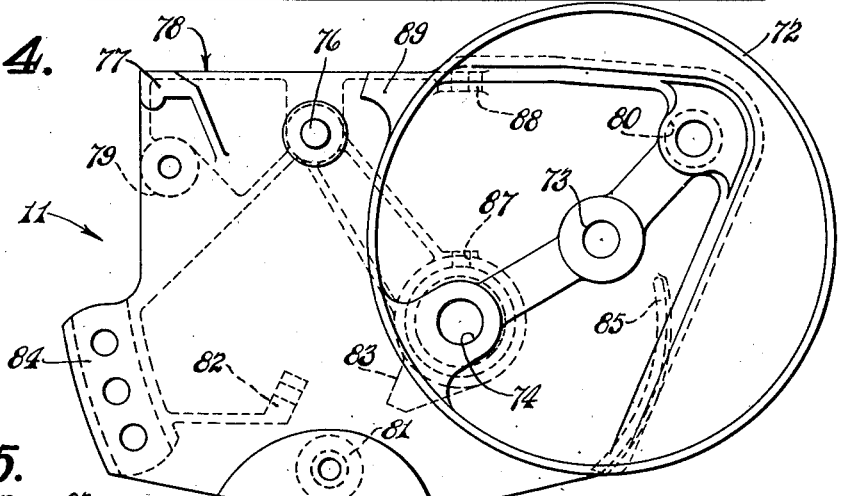
Fig. 4 is a side elevation of a frame plate for the opposite end of the mower reel.

A side frame 11 to support the reel and parts at the opposite end of the mower is shown by Figs. 4 and 5. As previously mentioned it is of a construction similar to that of frame 10. In place of the sprocket housing 20 and circular wall 21 of plate 10, frame 11 has an integral circular flange 72 around its wheel axle opening 73 to form a protective shield similar to the cup-shaped grass clipping guard 44 of frame 10. Flange 72 protects the internal ring gear of its adjacent wheel and a spur gear pinion on the reel shaft from dirt and clippings in the same manner as guard 44 protects the other wheel.

Corresponding parts of plate 11 in addition to the wheel axle opening 73 are a reel shaft opening 74 with bearing housing 75, a handle attaching pin 76, a stop flange 77 for the handle arm in a lowered position, a flat upper edge surface 78 for the adjacent end edge of the motor deck, a mounting boss 79 for an adjustable ring head bolt similar to bolt 51 of frame 10, a boss 80 for receiving the tie rod, a bed knife clamp holding boss 81, a set screw holding lug 82 and bearing lug 83 (corresponding to lugs 59 and 63 of frame 10) for the knife adjusting means, a roller bracket groove 84, and a grass deflector flange 85.

The bearing assemblies for the reel shaft in the housings 14 (Fig. 1) and 75 (Figs. 4 and 5) are lubricated by an oil tubing passage 86 (Fig. 1) mounted in a passage 87 in the housings 14 and 75. An integral bracket 88 adjacent the top of the castings supports the top of the tubing 86, the capped top of which is accessible at the level of the motor deck 50.

It will be noted that the handle pins 47 and 76 for attachment of the bifurcated arms of the mower handle are each on the outboard side of the frames 10 and 11. Thus an arm as at 48 in no way interferes with the chain 24, being shielded therefrom by the chain well and as will be readily understood by any suitable casing for the upper run of the chain.

By reason of the built up rigidity of the side panel 23 with its front and rear and intermediate integrally webbed connections to the casting plate proper of frame 10, and the projecting extension of reinforcing stud 46 into handle pin 47, it will be realized that sufficient strength is furnished for the tipping of the mower assembly on the roller 65 by manipulation of the mower handle. In operation of the mower for turning or backing up it is often desirable to depress the handle and carry the mower weight on the roller. The strain created on the handle and parts by such action finds support in the added strengthening of the panel 23 although spaced from the side frame plate on which the various parts are carried. It is to be noted also that the rear stop lug 49 is an extension in part of the top rear wall of the chain well. Thus the bearing force of arm 48 against the lug 49 is translated to the side frame plate. And while the pivotal lift on handle pin 47 is offset from the frame proper there is no undue twisting strain created to injure the assembly of parts.

On frame 11 a front stop lug 39 is provided for the abutment of the handle arm when pivoted to vertical or parking position. By attaching the handle arm 40 outside the chain 24 sufficient clearance is afforded for the raising of the arm to vertical position without interference with the motor and chain drive mechanism on the motor deck.

What is claimed is:

1. Side frame construction for a reel type power lawn mower comprising a casting plate with means at one side thereof for a bearing support of the mower reel shaft, an open sided sprocket housing having an integral flanged side wall at the other side of the plate and a chain well at the top of said housing communicating therewith, said chain well comprising an upper portion of said plate, an integral panel spaced therefrom with the lower edge of the panel providing an outer side edge for the upper portion of said sprocket housing, integrally connecting front and rear walls joining said panel and plate, and spaced web portions between said front and rear walls integrally joining the panel and plate to form front and rear chain well runways, one of said web portions of the chain well including an enlarged reinforcement stud integrally extending from said plate through the panel wall and terminating in a handle pin extension for pivotally anchoring the end of a mower handle arm at a forward and downward position from the top rear edge of the well, a handle lug integrally extending outwardly of the panel at said top rear edge to limit rotation of a handle arm pivotally mounted on the pin and to brace the same to tilt the frame, a wheel plate fixed to said casting plate covering the open side of said sprocket housing, said wheel plate being provided with a stub axle extending therefrom forwardly of the housing for mounting a mower wheel, and roller bracket mounting means at the lower rear corner of said plate, said roller mounting means being disposed substantially vertically below said handle arm lug.

2. In a reel type power lawn mower having spaced driving wheels and a deck supported therebetween with a motor mounted thereon, a side frame construction for carrying a sprocket and chain driving mechanism to drive said wheels and to support said motor deck and mower parts thereon, said side frame being adapted for mounting inwardly adjacent one of the mower wheels and comprising a casting plate with a horizontally disposed top inner edge adapted to receive the end edge of said deck and with means at the inner side of the plate for a bearing support of the mower reel shaft, an open sided sprocket housing at the other side of said plate with a flange integral with the plate for a lower side wall of said housing, a chain well at the top of said housing having a panel spaced from the upper portion of said plate with front and rear walls of the well integrally connecting the panel and plate and integrally extending upwardly from each side of said housing flange, spaced integral web portions between said panel and plate and intermediately positioned between the front and rear walls of the chain well to provide chain runways, one of said webs being formed with an enlarged stud extending from the plate through the panel and outwardly of the latter to provide a handle pin for pivotally anchoring the end of a handle arm, said pin being forwardly and downwardly of the rear top end edge of the plate, said plate at its top end edge having a handle lug extending outwardly therefrom to limit the pivotal swing of a handle arm on the pin and to support the arm for tilting the side frame, a wheel plate fixed to said frame plate covering the open side of said housing and having a stub axle forwardly of said housing adapted to receive a mower wheel, and a roller bracket mounting means on said plate substantially vertically below said handle lug, said frame being engageable by said handle on the lug for tilting the mower on a roller secured to said bracket.

WILLIAM E. SULLIVAN.

REFERENCES CITED

The following references are of record in the file of this patent:

UNITED STATES PATENTS

| Number | Name | Date |
| --- | --- | --- |
| 2,197,264 | Cooper | Apr. 16, 1940 |
| 2,269,920 | Seaver | Jan. 13, 1942 |